Dec. 22, 1970  R. M. LANE  3,548,575
CELERY HARVESTER

Filed Sept. 25, 1967

INVENTOR
ROY M. LANE

BY
ATTORNEY

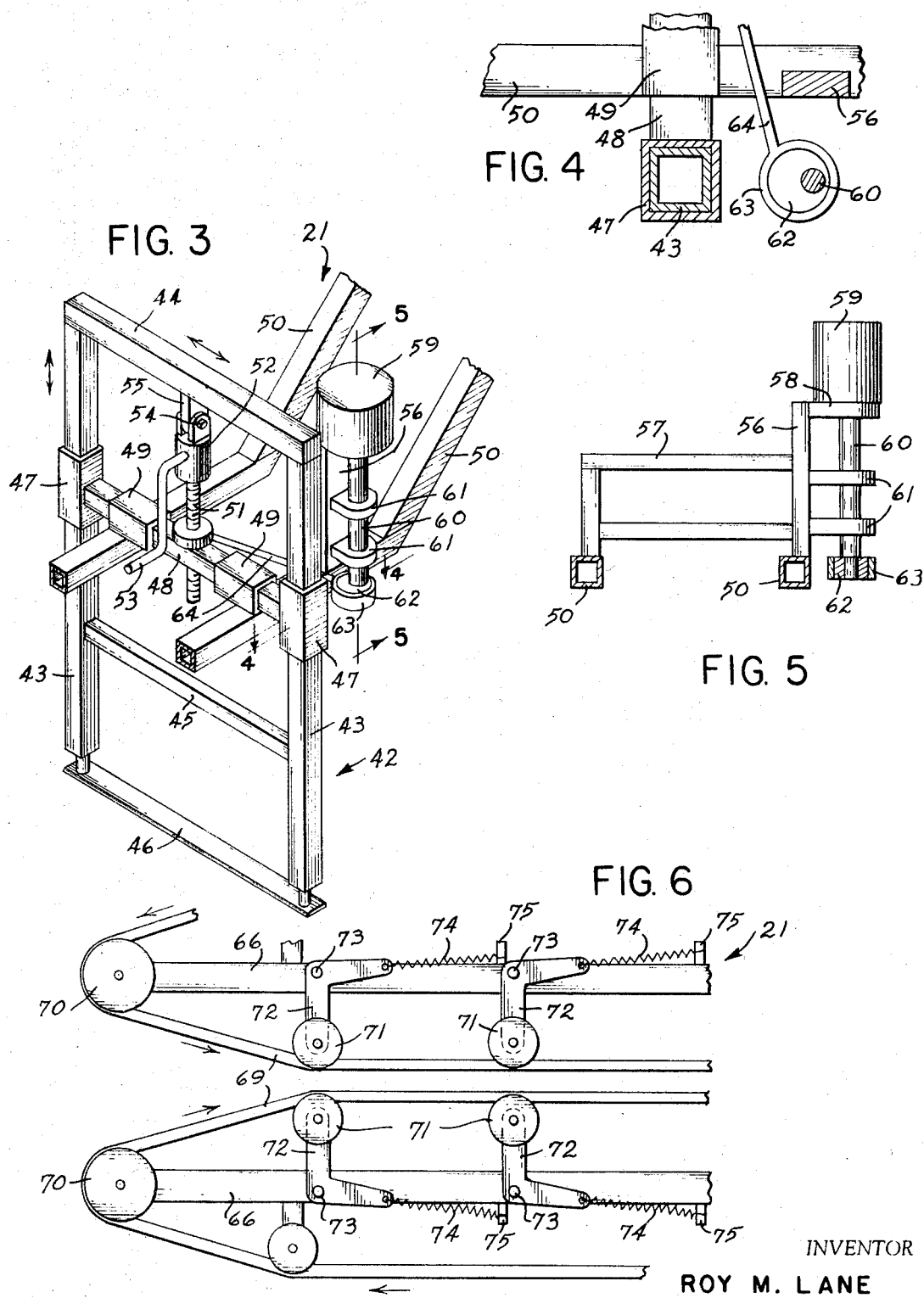

United States Patent Office 3,548,575
Patented Dec. 22, 1970

3,548,575
CELERY HARVESTER
Roy M. Lane, Box 192, Belle Glade, Fla. 33430
Filed Sept. 25, 1967, Ser. No. 670,279
Int. Cl. A01d 45/00
U.S. Cl. 56—327    5 Claims

ABSTRACT OF THE DISCLOSURE

Apparatus mountable on a propelling vehicle and movable along one or more rows of celery or other growing vegetation. Said apparatus includes means for removing the tops of the vegetation, means for severing the roots thereof, and means for lifting the vegetation from engagement with the ground.

BACKGROUND OF THE INVENTION

Field of the invention

This invention relates generally to apparatus for harvesting vegetation, and particularly to equipment which will remove the tops of celery from the stalks in a field and thereafter sever the roots and lift the stalks to an elevated position where they can be discharged into a container, truck or other receptacle.

Description of the prior art

Much work has been done in the harvesting of vegetation, including celery; however, prior art devices have not been successful due primarily to the fact that celery is fragile and easily bruised and when bruised is unacceptable for the commercial market. Therefore, it has been necessary to provide a rugged machine capable of withstanding hard usage while remaining sufficiently delicate to prevent the bruising of the product. Efforts have been made to cut the top growth and then sever the roots and leave the celery in the field for subsequent collection by hand. However, this has not materially reduced the amount of hand labor involved. Other devices have been provided which have attempted to collect and remove the stalks of celery from the field. However, the machines which were sufficiently rugged to withstand heavy usage were not delicate enough to prevent bruising of the celery.

SUMMARY

This invention relates to a celery harvester which can be mounted on a propelling vehicle and selectively moved into and out of engagement with the ground. The harvester includes one or more rotary blades for detaching the tops of the celery while the celery is still in the ground, severing the stalks from the roots by a reciprocating knife having a slicing action, and yieldably engaging and elevating the celery stalks to a position above the ground and subsequently discharging such stalks into a container or receptacle.

It is an object of the invention to provide practical and efficient apparatus for harvesting celery and other kindred products, and which is sufficiently rugged to withstand heavy usage and delicate enough to remove the stalks of celery from the field without bruising the same, as well as apparatus the use of which will result in material saving of labor and resultant expense of harvesting.

Another object of the invention is to provide a celery harvester which will remove the tops from the stalks, sever the stalks from the roots, and remove the stalks from the ground and convey and discharge the same into a container or receptacle without bruising and all with unskilled and minimum labor, attention, and overall space required in which the machine can operate.

BRIEF DESCRIPTION OF THE DRAWINGS

FIG. 3, an enlarged fragmentary detailed perspective of the root severing mechanism;
FIG. 4, an enlarged fragmentary detailed section on the line 4—4 of FIG. 3;
FIG. 5, a section on the line 5—5 of FIG. 3;
and
FIG. 6, an enlarged fragmentary section on the line 6—6 of FIG. 1.

DESCRIPTION OF THE PREFERRED EMBODIMENT

Figure 1:
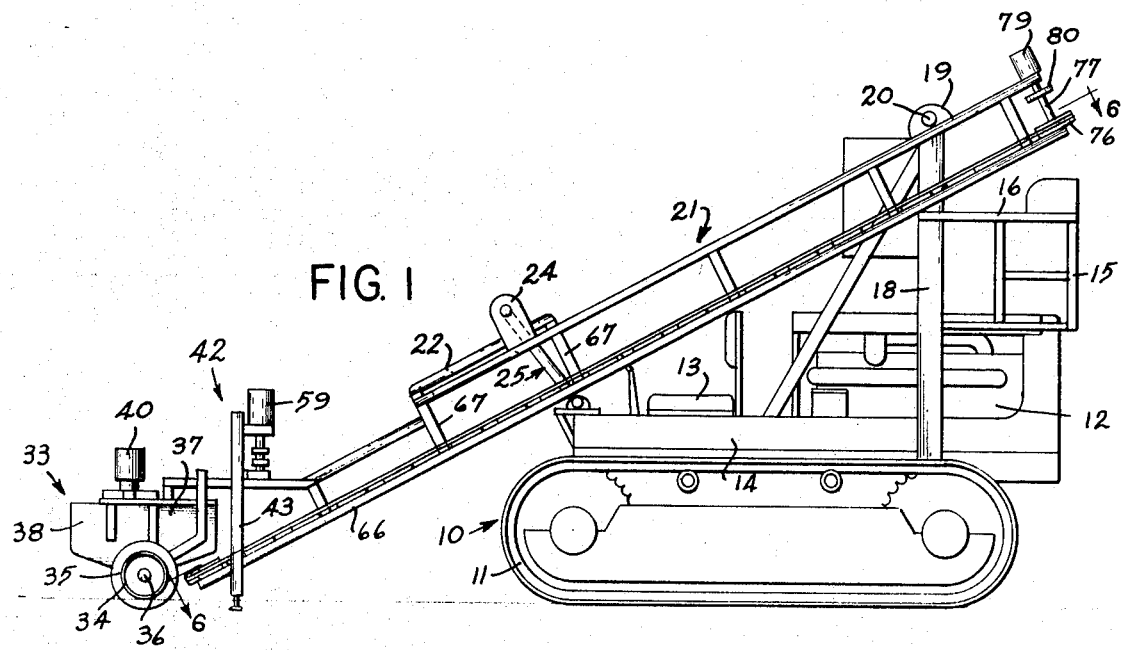
FIG. 1 is a side elevation illustrating one application of the invention mounted on a propelling vehicle.

With continued reference to the drawings, a propelling vehicle 10 is provided having wheels, tracks or other earth-engaging members 11 driven by a power plant 12. A seat or operator's station 13 is located on the body 14 of the vehicle in a position to provide maximum visibility by the operator. At the rear of the vehicle a framework 15 is mounted on the body 14 and is adapted to support a table 16, as illustrated, or such framework could support a conventional chute, conveyor or other structure (not shown) by which celery stalks could be discharged from the machine.

Figure 2:
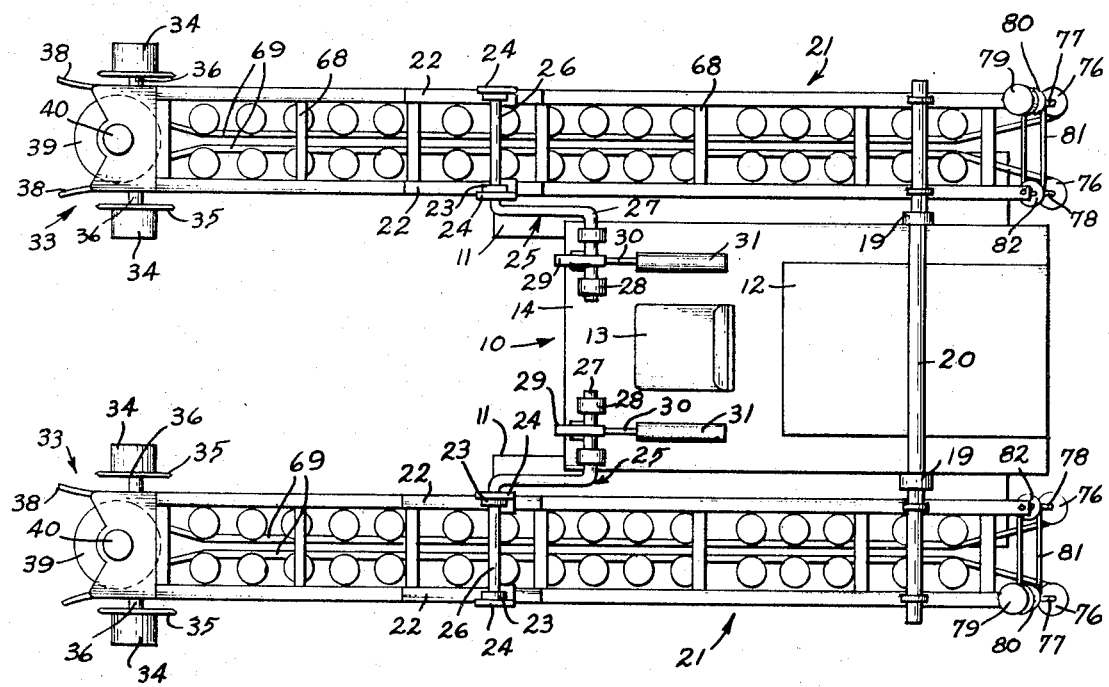
FIG. 2, a plan view thereof with parts omitted.

Adjacent to the read of the body 14 is an upstanding post 18 mounted on each side of the body and having a pillow block 19 at its upper end which receives a shaft 20 to which one or more conveyor frames 21 are attached. As illustrated in FIG. 2 a conveyor frame 21 is mounted at each side of the propelling vehicle; however, it is contemplated that a single conveyor frame could be mounted on either side of the vehicle.

In order to raise and lower the conveyor frames 21 about the shaft 20 each of the conveyor frames is provided with a pair of slideways 22 on which blocks 23 are slidably mounted and each of such blocks has an upstanding lug 24 so that a pair of spaced lugs are provided for each conveyor frame. A crank 25 has one end 26 pivotally mounted in a pair of the lugs 24 and the opposite end 27 of the crank is pivotally journaled in a pair of pillow blocks 28 mounted on the body 14 of the vehicle. In order to raise and lower the conveyor frames a lever 29 is fixed to the end 27 of the crank intermediate the pillow blocks 28 and such lever is connected to a piston rod 30 carried by a fluid cylinder 31. When the piston rod is extended it will apply a force against the lever 29 and rotate the crank 25. Rotation of the crank will cause the opposite end 26 to move through an arc and cause the blocks 23 to slide on the slideways 22 so that the conveyor frame will be raised and lowered.

At the front of each of the conveyor frames 21 a cutter head 33 is provided and includes a rotatably mounted ground-engaging cylinder or wheel 34 at each side and each of such wheels is provided with a colter blade 35 which penetrates the earth to sever laterally extending roots. The wheels 34 are relatively broad in order not to sink into soft earth and are mounted on stud shafts 36 carried by guide members 37 having outwardly flaring front portions 38 which guide the stalks of celery into the cutter head 33. At the top of the cutter head is located one or more circular blades 39 driven by a motor 40 of any desired type, such as fluid, electric or internal combustion. The blades 39 are adapted to cut the tops from the stalks of celery before they are harvested.

Directly behind the cutterhead 33 is an auxiliary, or root cutter frame 42, for instance best illustrated in FIG. 3, which includes a pair of upright side bars 43 connected by an upper cross member 44 and a lower intermediate cross member 45. The lower ends of the side bars 43 are adapted to carry a blade 46 for severing the stalks of celery from the roots.

In order to raise and lower the frame 42 to adjust the blade 46 and cause such blade to cut at the proper height, the side bars 43 are slidably mounted within sleeves 47 fixed to a cross bar 48. The cross bar extends through a pair of sleeves 49 welded or otherwise attached to upper generally parallel bars 50 forming the upper portion of the conveyor frame 21. Intermediate the sleeves 49 the cross bar 48 is provided with a threaded shaft 51 having a crank operated mechanism 52 at the upper end and with a crank 53. The crank mechanism is connected by a pin 54 to a lug 55 carried by the upper cross member 44 so that when the crank 53 is operated the threaded shaft 51 will be rotated to raise and lower the frame 42 depending upon the direction of rotation of the crank.

It is desirable to cause the blade 46 to reciprocate endwise and to impart a slicing action to such blade as it severs the celery stalks from the roots. This is done by providing a support 56 (FIGS. 3, 4 and 5) mounted on one of the upper bars 50 and having a brace 57 extending to the other upper bar to rigidly mount the support. A motor mount 58 is fixed to the upper portion of the support 56 and such motor mount is adapted to carry a motor 59 which may be of any desired type, such as fluid, electric or the like. A shaft 60 extends downwardly from the motor 59 and such shaft is journaled in support bearings 61 and at its free end is connected to an eccentric 62 carried within a housing 63. The housing 63 is connected by a shaft 64 to the intermediate portion of the cross bar 48 so that when the motor is operated the shaft will rotate and cause rotation of the eccentric 62 and thereby cause rapid reciprocation of the shaft 64. Movement of the shaft 64 will move the cross bar 48 back and forth within the sleeves 49 and reciprocate the frame 42 with the blade 46.

The upper bars 50 of the conveyor frame 21 are connected to lower bars 66 by a plurality of posts 67 and are connected to each other by cross braces 68 to form a frame which is generally rectangular in cross-section. In order to raise the celery stalks from the ground after the roots have been cut, a pair of cooperating opposed endless belts 69 are mounted on the conveyor frame 21 and are adapted to extend inwardly to a position adjacent to the longitudinal center line of such conveyor frame. A front pulley 70 is mounted on each of the lower bars 66 and such pulleys function as idlers about which the belts 69 are directed. Intermediate the ends of the conveyor frame 21 a plurality of resiliently mounted wheels or presser pulleys 71 are provided for locating the belt 69 in closely spaced relation with each other. Each of the pulleys 71 is rotatably mounted on one end of a bell crank 72 having its intermediate portion pivotally mounted by a pin 73 to the lower bars 66 and the opposite end of such bell crank is connected by a spring 74 to a lug 75 projecting outwardly from the lower bars 66 in spaced relation to the bell cranks. As illustrated in FIG. 6 the relationship between the idler pulleys 70 and the intermediate pulleys 71 is such that a generally V-shaped lead-in portion will be provided for directing the stalks of celery between the belts 69. It is necessary that the belts 69 grip and hold the stalks of celery with sufficient pressure to prevent th stalks from falling by gravity and with sufficient resiliency that such stalks will not be bruised. When the belts 69 are driven they will engage opposite sides of the stalks of celery and raise the same to an elevated position. When a larger than usual stalk is received between the belts it will cause the bell crank 72 to pivot about the pin 73 against the tension of the spring 74 without damage to the celery stalk. As soon as the larger stalk has passed a particular intermediate pulley, the spring 75 will again return the pulley to its original position.

The belts 69 extend upwardly to the rear portion of the conveyor frame 21 where they pass around a drive pulley 76 mounted on the lower bars 65. In order to synchronize the movement of the belt 69 such drive pulleys are mounted on shafts 77 and 78 at opposite sides of the conveyor frame 21 and the shaft 77 is driven by a motor 79 at any desired speed. A sprocket 80 is mounted on the shaft 77 and such sprocket drives a chain 81 which extends around a sprocket 82 carried by the shaft 78, such sprockets 80 and 82 being the same size so that the belts will be synchronized when driven.

In the operation of the device the vehicle is moved to a growing field of celery or other product to be harvested after which the cutter head 33 is lowered until the wheels 34 are in engagement with the ground at one end of a row of celery. As the vehicle advances the circular blade 39 will remove the tops of the celery and thereafter the stalks of celery will be guided between the belts 69 and the blade 46 will sever the stalks from the roots. The stalks of celery which have been severed from the roots will be raised by the belts 69 to the rear of the vehicle where they will be discharged onto a table or conveyor 16 or directly discharged from the machine.

It will be obvious to one skilled in the art that various changes may be made in the described embodiment of the invention without departing from the spirit and scope thereof and therefore the invention is not limited by that which is illustrated in the drawings and described in the specification, but only as indicated in the accompanying claims.

What is claimed is:

1. A celery harvester for mounting on a propelling vehicle and comprising an elongated main frame swingably mounted on said vehicle, a cutter head located at one end of said main frame, ground-engaging means for supporting said cutter head and said one end of said frame, said cutter head having severing means for detaching the tops from stalks of celery, an auxiliary frame adjustably mounted on said main frame adjacent said cutter head and disposed substantailly transversely of the longitudinal axis of said main frame, an elongated cutting blade mounted on said auxiliary frame and disposed rearwardly of and below said top severing means, means on said auxiliary frame for adjusting said cutting blade in a vertical plane to vary the vertical distance between the top severing means and said blade, means slidably mounting said auxiliary frame on said main frame, and means carried by said main frame and associated with said auxiliary frame for reciprocating said auxiliary frame and said cutting blade in said sliding means substantially transversely of said longitudinal axis, said cutting blade adapted to cut celery stalks below the surface of the earth in the field.

2. The structure of claim 1 including a pair of opposed endless belts mounted on said main frame and extending through said auxiliary frame and adapted to engage stalks of celery before such stalks are cut from the roots by said elongated cutting blade.

3. The structure of claim 2 including spring operated means pressing portions of said belts toward each other to resiliently grip the stalks of celery.

4. The structure of claim 1 in which said cutter head includes opposed guide means for guiding stalks of celery to said top severing means and said elongated cutting blade.

5. The structure of claim 1 including elevating means carried by said vehicle for raising said main frame and said cutter head out of engagement with the ground.

References Cited
UNITED STATES PATENTS

| | | | |
|---|---|---|---|
| 1,573,020 | 2/1926 | Scruggs | 56—27.5 |
| 2,522,308 | 9/1950 | Silva | 171—22 |
| 2,907,393 | 10/1959 | Hawkins | 171—61 |
| 3,328,943 | 7/1967 | Marmorine et al. | 56—327 |
| 3,442,071 | 5/1969 | Duda, Jr. | 56—327 |

RUSSELL R. KINSEY, Primary Examiner